United States Patent
Otten et al.

(10) Patent No.: US 10,984,503 B1
(45) Date of Patent: Apr. 20, 2021

(54) METHOD AND SYSTEM FOR VEHICLE IMAGE REPOSITIONING USING MACHINE LEARNING

(71) Applicant: Autodata Solutions, Inc., El Segundo, CA (US)

(72) Inventors: Hans Otten, London (CA); Jerad William, London (CA); Ming Cong, Long Beach, CA (US)

(73) Assignee: Autodata Solutions, Inc., Troy, MI (US)

( * ) Notice: Subject to any disclaimer, the term of this patent is extended or adjusted under 35 U.S.C. 154(b) by 0 days.

(21) Appl. No.: 16/290,762

(22) Filed: Mar. 1, 2019

Related U.S. Application Data

(60) Provisional application No. 62/638,004, filed on Mar. 2, 2018.

(51) Int. Cl.
| | |
|---|---|
| *G06T 3/20* | (2006.01) |
| *G06T 7/70* | (2017.01) |
| *G06T 7/12* | (2017.01) |
| *G06T 3/40* | (2006.01) |
| *G06T 7/60* | (2017.01) |

(52) U.S. Cl.
CPC ............... *G06T 3/20* (2013.01); *G06T 3/40* (2013.01); *G06T 7/12* (2017.01); *G06T 7/60* (2013.01); *G06T 7/70* (2017.01); *G06T 2207/20081* (2013.01); *G06T 2207/30252* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,978,519 | A * | 11/1999 | Bollman | G06T 7/70 382/270 |
| 7,133,571 | B2 * | 11/2006 | Cheatle | G06K 9/38 382/282 |
| 7,528,846 | B2 * | 5/2009 | Zhang | H04N 7/0122 345/619 |
| 7,684,916 | B2 * | 3/2010 | Wei | A01B 69/001 701/50 |
| 8,406,515 | B2 * | 3/2013 | Cheatle | G06T 3/00 382/164 |

(Continued)

OTHER PUBLICATIONS

Ren et al., Faster r-cnn: towards real-time object detection with region proposal networks, 2015, Advances in Neural Information Processing Systems 28 (NIPS 2015), pp. 1-9 (Year: 2015).*

*Primary Examiner* — Motilewa Good Johnson
(74) *Attorney, Agent, or Firm* — Rutan & Tucker, LLP

(57) ABSTRACT

An image readjustment system featuring a communication interface, one or more processors, and a persistent storage. The persistent storage is communicatively coupled to the one or more processors. The persistent storage comprises at least image location logic and image cropping logic. The image location logic is configured to receive and analyze an incoming image, using a machine learning analysis, to determine a location of a particular component within the incoming image and to calculate coordinates of a boundary area surrounding the particular component. The image cropping logic is configured to remove portions of the incoming image outside of the boundary area to generate a modified image to be rendered for display.

18 Claims, 11 Drawing Sheets

(56) References Cited

U.S. PATENT DOCUMENTS

| | | | | |
|---|---|---|---|---|
| 9,070,402 | B2* | 6/2015 | Burtnyk | G11B 27/034 |
| 9,972,092 | B2* | 5/2018 | Lin | G06K 9/66 |
| 9,996,761 | B2* | 6/2018 | Chen | G06K 9/46 |
| 10,027,888 | B1* | 7/2018 | Mackraz | G06K 9/00228 |
| 10,346,723 | B2* | 7/2019 | Han | G06T 3/40 |
| 10,699,413 | B1* | 6/2020 | Ansari | G06K 9/4604 |
| 2013/0250114 | A1* | 9/2013 | Lu | H04N 5/23238 |
| | | | | 348/148 |
| 2015/0036931 | A1* | 2/2015 | Loui | G06K 9/4671 |
| | | | | 382/195 |
| 2016/0259994 | A1* | 9/2016 | Ravindran | G06K 9/00 |
| 2016/0381306 | A1* | 12/2016 | Yang | G06T 3/40 |
| | | | | 386/280 |
| 2017/0300785 | A1* | 10/2017 | Merhav | G06K 9/6257 |
| 2017/0301063 | A1* | 10/2017 | Merhav | G06T 3/4046 |
| 2018/0096497 | A1* | 4/2018 | Bennett | G06T 3/60 |
| 2018/0103209 | A1* | 4/2018 | Fischler | G06F 3/04815 |
| 2018/0181593 | A1* | 6/2018 | Ranzinger | G06F 16/5838 |
| 2018/0314878 | A1* | 11/2018 | Lee | G06K 9/3241 |
| 2018/0357803 | A1* | 12/2018 | Zhang | G06T 11/60 |
| 2019/0103026 | A1* | 4/2019 | Liu | G06K 9/00805 |
| 2019/0132520 | A1* | 5/2019 | Gupta | H04N 5/232127 |
| 2019/0164313 | A1* | 5/2019 | Ma | G06K 9/6256 |
| 2019/0279044 | A1* | 9/2019 | Vasisht | G06K 9/46 |

* cited by examiner

METHOD AND SYSTEM FOR VEHICLE IMAGE REPOSITIONING USING MACHINE LEARNING

CROSS-REFERENCE TO RELATED APPLICATIONS

This application claims the benefit of priority on U.S. Provisional Application No. 62/638,004 filed Mar. 2, 2018, the entire contents of which are incorporated by reference herein.

FIELD

Embodiments of the disclosure relate to the field of display imaging. More specifically, one embodiment of the disclosure relates to a system and method for automatically analyzing vehicle images using a machine learning model to increase and maintain consistent vehicle representation quality.

GENERAL BACKGROUND

Vehicle dealerships often have several vehicles located on their lots, sometimes hundreds or even thousands spread among a plurality of lots. Consumers may physically visit a dealership and their associated lots to view specific vehicles in person. By doing so, a consumer has the opportunity to assess the condition of a specific vehicle and review the specific vehicle's exact features. In such situations, a consumer is able to obtain a complete understanding of a specific vehicle the consumer may desire to purchase.

However, physically visiting a dealership is often inconvenient for consumers. For example, consumers may have busy schedules and be unable to visit the dealership during the hours the dealership is open. Additionally, the internet has provided a medium for presenting consumers information such that a consumer may review the information at any time and at any place, assuming an internet connection is available.

As a result, dealerships have begun to utilize the internet and create websites that provide consumers with information directed to vehicles on their lots. These dealership websites have several flaws and, as a result, do not provide consumers the same opportunity to obtain a complete understanding of a specific vehicle as provided when physically visiting a dealership's lot and inspecting a specific vehicle in person. For example, dealership websites often provide digital images of vehicles that may be referred to as "stock images." Stock images are generic images of a certain make and model of a vehicle provided by the manufacturer, not images of a specific vehicle located at a particular dealership having a unique Vehicle Identification Number (VIN). When a dealership website utilizes stock images, upon visiting the dealership website, a consumer may obtain a general understanding of a particular vehicle type; however, the consumer is unable to see the specific vehicles residing at the dealership. Additionally, the stock images may not provide enough angles or views of the vehicle to assist the consumer in deciding whether to purchase the vehicle or visit the dealership.

In most instances, in lieu of stock images, dealership websites may utilize images of specific vehicles at their dealerships (referred to as "lot images"). Specifically, dealerships obtain digital images of the specific vehicles on their lots from a third-party photographer, who is hired to take a set of photographs of certain vehicles and transmit the digital images to the dealership for placement on its website along with textual information directed to the vehicle features captured by each digital image.

The challenge of using lot images is maintaining a consistent quality of images to upload onto the dealership website. Typically, lot photos from dealers vary in terms of quality, size, and accuracy of the vehicle being photographed. Furthermore, in some situations, there are discrepancies in layout, vehicle location, and background between lot images of different vehicles, and worse yet, lot images for the same vehicle. In short, the advertised vehicle is not prominently displayed on a consistent basis and there is no automated mechanism to address lot image inconsistency, which is creating poor representations of vehicles to online consumers.

Furthermore, as an aside, current systems and methods used by dealerships using lot images of the actual vehicles also fail to present an image of a particular view and/or feature along with information describing the view and/or feature shown. In fact, the images received by a dealership do not include any information identifying the features or view shown in each image. Therefore, although the dealership may provide textual information describing the features of the specific vehicle on their website there is no coordination between the textual information and the vehicle image displayed. This is complicated by the fact that a dealership may have hundreds or thousands of vehicles on their lots and, as there is high turnover on dealerships' lots, automated adjustment of the view and features shown in each image is essential, which is lacking currently.

BRIEF DESCRIPTION OF THE DRAWINGS

Embodiments of the disclosure are illustrated by way of example and not by way of limitation in the figures of the accompanying drawings, in which like references indicate similar elements and in which.

DETAILED DESCRIPTION

Figure 1:
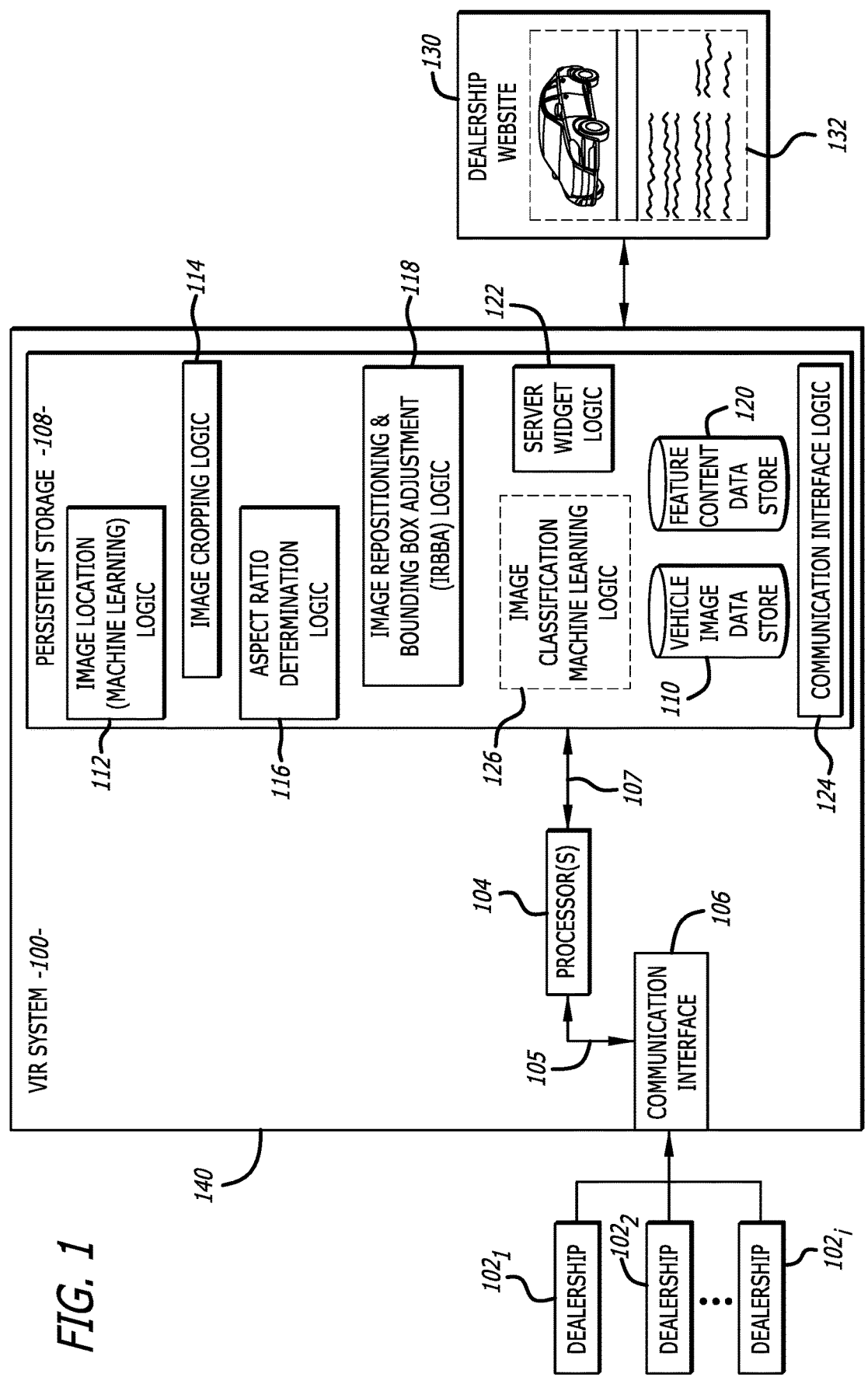
FIG. 1 illustrates an exemplary embodiment of a logical representation of an automated, vehicle image readjustment (VIR) system.

Various embodiments of the disclosure are directed to an automated system and method for analyzing vehicle images using machine learning (ML) logic, trained through supervised learning, to identify a positioning of a vehicle targeted for display, perform automated cropping of the vehicle and, in some cases, maintain the same aspect ratio as the original vehicle image when the cropped vehicle image is rendered. Stated differently, one embodiment of the disclosure is directed to conducting an analysis of a vehicle image, identifying the actual vehicle within the original digital image, and cropping the unnecessary parts of the digital image out (without losing the aspect ratio of the digital image), so that you can present a better quality image that focuses on the vehicle to the consumer. Additionally, the vehicle images may be classified, using machine learning techniques, for rendering a display including at least one of the modified vehicle images along with corresponding textual information describing the view and/or vehicle features included in the one or more vehicle images. The classification of the vehicle images is described in U.S. patent application Ser. No. 16/290,696 entitled "Method and System for Vehicle Image Classification," filed Mar. 1, 2019, the entire contents of which are incorporated by reference herein.

More particularly, the vehicle image readjustment (VIR) system receives and stores images of vehicles maintained at the dealership from various perspectives of vehicles. More specifically, the VIR system receives a list of active inventory records, where each inventory record includes a plurality of fields that describe a vehicle associated with that inventory record. One of the fields is a list of dealer images (lot images). According to one embodiment, the inventory records may be downloaded from different dealerships at different or concurrent (e.g., at least partially overlapping in time) periods of time such as downloads on a nightly basis, weekly basis, every couple of days, or the like.

According to one embodiment of the disclosure, an image location logic of the VIR system analyzes the incoming lot images using machine learning techniques to determine a location of a vehicle being the key component of the lot image (hereinafter, "vehicle image") and calculates the coordinates of a boundary area that surrounds the vehicle. The boundary area may be represented as a square or rectangular bounding box. Thereafter, the image location logic provides the coordinates of the bounding box, namely the upper-left coordinate ($x_0, y_0$) and the lower-right coordinate ($x_1, y_1$), to image cropping logic. The image cropping logic removes portions of the original lot image outside of the bounding box (i.e., referred to as "cropping" the original lot image) to generate a modified lot image to be rendered on a website of the dealership that provided the lot image. Herein, the feature content of the vehicle will be displayed with its associated modified lot image(s) as part of a marketing view.

Optionally, the image location logic may be configured to determine whether the dealer has made changes to the lot image(s) in order to customize the lot images for that particular dealer. For instance, the customized lot image(s) may include dealership information, particular salesperson information and/or logos that the dealer paid to customized its lot images. Upon detection of the lot image being customized, the image location logic does not perform the process of calculating coordinates of a boundary area surrounding the vehicle, as the image location logic wants to avoid cropping to retain the changes made to the lot image(s).

According to another embodiment of the disclosure, an aspect ratio (AR) determination logic determines an aspect ratio of an incoming, original lot image. Concurrently, the image location logic of the VIR system analyzes the original lot image using machine learning techniques to determine a location of a vehicle within the original (lot) vehicle image and calculates the coordinates of the bounding box. As described above, the coordinates of the bounding box may include the upper-left coordinate ($x_0, y_0$) and the lower-right coordinate ($x_1, y_1$). The coordinates of the bounding box and the aspect ratio of the original lot image are utilized to produce a secondary bounding box, which includes the vehicle and features an aspect ratio that is identical (or substantially equivalent within a predetermined error margin such as 3%) to the aspect ratio of the original (lot) vehicle image. The vehicle is substantially centered within the secondary bounding box. Thereafter, the coordinates of the secondary bounding box are provided to the image cropping logic, which crops portions of the original lot image outside of the second bounding box to generate a modified lot image to be rendered on a website of the dealership that provided the original lot image. Herein, the feature content of the vehicle will be displayed with its associated modified lot image(s) as part of a marketing view.

Although the disclosure discusses the invention with respect to vehicle dealerships and vehicle images, such is merely one exemplary embodiment and the disclosure is not intended to be so limited. The image readjustment scheme described herein may be used for any type of image where automatic repositioning of a key component of the image is needed, where the image readjustment scheme may be used in selling/renting houses or any product as well as dating sites to focus photographs on a targeted individual. The principles of the disclosure include, but are not limited to, receipt of a set of images, analysis of the set of images for a key component within the original image and creation of a modified image and descriptive information corresponding to the modified image, may be utilized in many embodiments other than with dealerships and vehicle images.

I. Terminology

In the following description, certain terminology is used to describe features of the invention. For example, in certain situations, the terms "logic" and "component" are representative of hardware, firmware or software that is configured to perform one or more functions. As hardware, logic (or component) may include circuitry having data processing or storage functionality. Examples of such circuitry may include, but are not limited or restricted to a hardware processor (e.g., microprocessor with one or more processor cores, a digital signal processor, a programmable gate array, a microcontroller, an application specific integrated circuit "ASIC," etc.), a semiconductor memory, or combinatorial elements.

Alternatively, the logic (or component) may be software, such as executable code in the form of an executable application, an Application Programming Interface (API), a subroutine, a function, a procedure, an applet, a servlet, a routine, source code, object code, a shared library/dynamic load library, or one or more instructions. The software may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; semiconductor memory; non-persistent storage such as volatile memory (e.g., any type of random access memory "RAM"); or persistent storage such as non-volatile memory (e.g., readonly memory "ROM," power-backed RAM, flash memory, phase-change memory, etc.), a solid-state drive, hard disk drive, an optical disc drive, or a portable memory device. As firmware, the logic (or component) may be stored in persistent storage.

A "vehicle" is any motorized conveyance that allows a person to travel a greater distance in a shorter period of time than the person could travel alone. One type of vehicle is an automobile that includes a chassis supported by four or more wheels (e.g., a car or a truck). Another type of vehicle is a conveyance without a chassis, such as a motorcycle, an all-terrain vehicle such as a quad, or a scooter for example. Yet another type of vehicle is a boat, wave runner or other water conveyance.

The term "network device" should be construed as electronics with the data processing capability and/or a capability of connecting to any type of network, such as a public network (e.g., Internet), a private network (e.g., a wireless data telecommunication network, a local area network "LAN", etc.), or a combination of networks. Examples of a computing device may include, but are not limited or restricted to, the following: a server, an endpoint device (e.g., a laptop, a smartphone, a tablet, a desktop computer, a netbook, a medical device, or any general-purpose or special-purpose, user-controlled electronic device); a mainframe; a router; or the like.

A "communication" generally refers to information transmitted in one or more electrical signals that collectively represent electrically stored data in a prescribed format. Each communication may be in the form of one or more packets, frames, HTTP-based transmissions, signals transmitted over telephone lines, or any other series of bits having the prescribed format. The term "computerized" generally represents that any corresponding operations are conducted by hardware in combination with software and/or firmware.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

II. General Architecture

Referring now to FIG. 1, an exemplary embodiment of a logical representation of a vehicle image readjustment (VIR) system 100 is shown. The VIR system 100, in one embodiment, may be stored on a non-transitory computer-readable storage medium of a server device that includes a housing 140, which is made entirely or partially of a hardened material (e.g., hardened plastic, metal, glass, composite or any combination thereof) that protects the circuitry within the housing 140, namely one or more processor(s) 104 coupled to a communication interface 106 via a first transmission medium 105. The communication interface 106, under control by a communication interface logic 124 processed by the processor(s) 104, enables communications with external network devices, such as network devices of dealerships $102_1$-$102_i$ and network devices of consumers (not shown), which may display a website 130. According to one embodiment of the disclosure, the communication interface 106 may be implemented as a physical interface including one or more ports for wired connectors. Additionally, or in the alternative, the communication interface 106 may be implemented with one or more radio units for supporting wireless communications with other electronic devices. The communication interface logic 124 may include logic for performing operations of receiving and transmitting electronic data via the communication interface 106 to enable communications between the VIR system 100 and network devices via a network (e.g., the internet) and/or cloud computing services.

The processor(s) 104 are further coupled to a persistent storage 108 via a second transmission medium 107. According to one embodiment of the disclosure, the persistent storage 108 may include some or all of the following components: a vehicle image data store (e.g., database) 110, an image location (machine learning) logic 112, image clipping logic 114, an optional aspect ratio (AR) determination logic 116, image repositioning and bounding box adjustment (IRBBA) logic 118, a feature content data store (e.g., database) 120, server widget logic 122, and/or the communication interface logic 124. Of course, when implemented as hardware, one or more of these logic units could be implemented separately from each other.

In particular, each of the dealerships $102_1$-$102_i$ may use the VIR system 100 by integrating logic, e.g., embedding a widget being software code, into the websites that call the server widget logic 122 when the dealership's website 130 is loaded by a consumer. For example, the widget may be loaded on the dealership website 130 or an intermediary website that accesses the dealership website 130. The VIR system 100 enables a consumer, after loading a dealership's website, to select a specific vehicle located on the dealership's lot and view additional details of the specific vehicle in order to obtain a complete understanding of the specific vehicle. In particular, in response to receiving user input indicating a selection of a specific vehicle, the widget communicates with the server widget logic 122 to obtain information pertaining to the specific vehicle, e.g., vehicle images (e.g., digital images or Uniform Resource Locator (URL) link to vehicle images) and textual information describing features or views illustrated in each vehicle image. As described below, one or more of these vehicle images may be modified based on operations between the image location logic 112, the image clipping logic 114, the AR determination logic 116, and/or the operational image repositioning and bounding box adjustment logic 118, as collectively illustrated in FIG. 3 and FIG. 5.

The widget is then able to render a display illustrating a modified image of the selected vehicle and textual information describing the features included in the modified vehicle image. Exemplary embodiments of operations performed by the VIR system 100 are illustrated in FIGS. 2-8 and will be discussed in further detail below, along with specific details of the logic modules and databases included within the VIR system 100.

Figure 2:
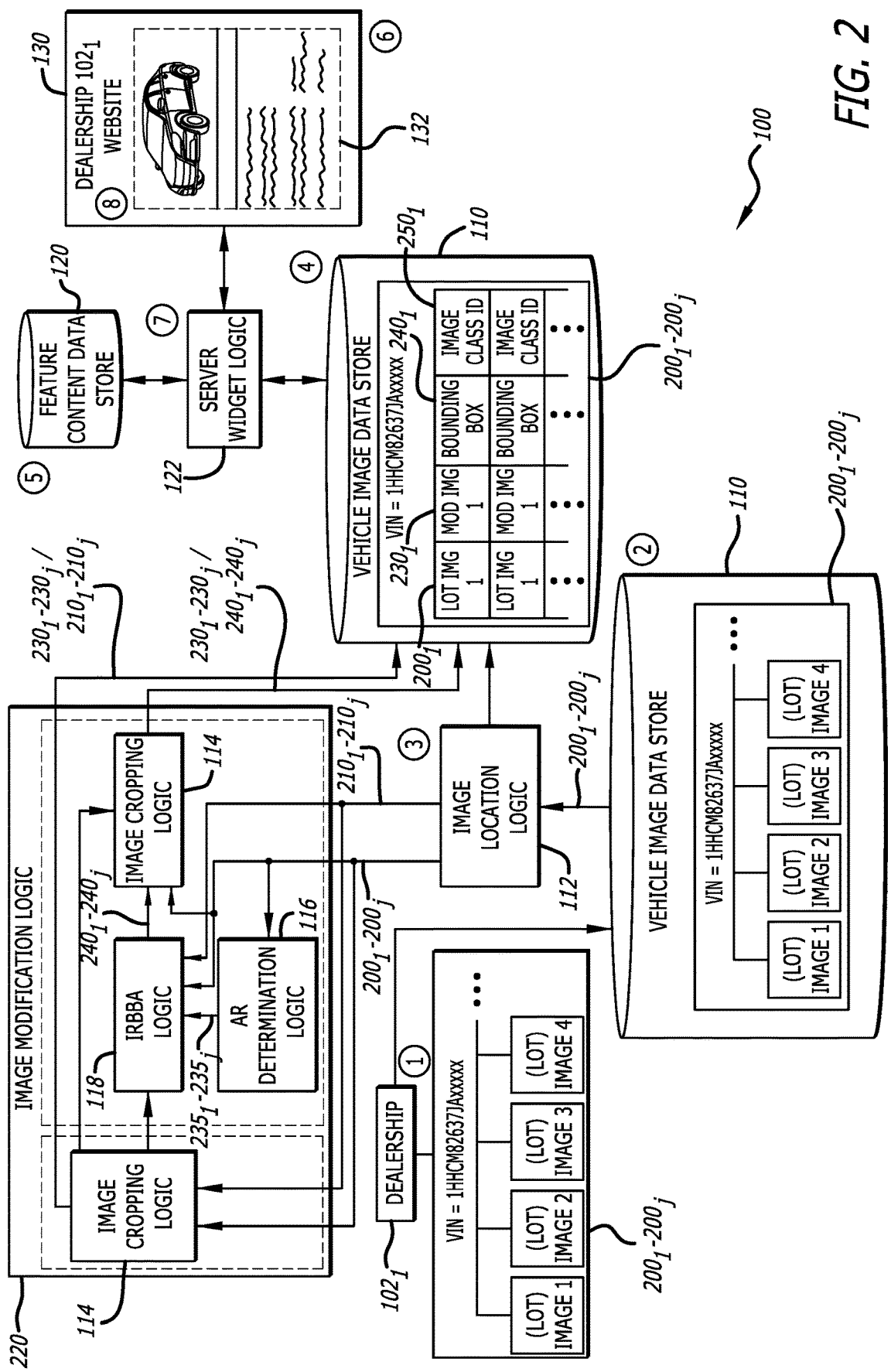
FIG. 2 illustrates an exemplary block diagram illustrating a general flow of operations performed by the VIR system of FIG. 1.

Referring to FIG. 2, a block diagram illustrating a general flow of operations performed by the vehicle image readjustment (VIR) system 100 of FIG. 1 is shown. As discussed above in FIG. 1, the VIR system 100 includes at least the vehicle image data store 110 that stores digital vehicle images, image location logic 112, image cropping logic 114, and the feature content data store 120. It should be noted that, as illustrated in FIG. 1, a plurality of dealerships $102_1$-$102_i$, may utilize the VIR system 100. However, for purposes of clarity, in the embodiment illustrated in FIG. 2, a single dealership, e.g., the dealership $102_1$, is shown as utilizing the VIR system 100.

First, the dealership $102_1$ obtains a set of vehicle images, e.g., the plurality of vehicle images $200_1$-$200_j$. The set of vehicle images may include original (lot) images, namely digital images obtained through, for example, a third-party photographer hired to take digital photographs of the vehicles parked at the dealership $102_1$. The original vehicle images $200_1$-$200_j$ may be in any image file format, with examples including, but not limited or restricted to Joint Photographic Experts Group (JPEG), Tagged Image File Format (TIFF), Raw, Portable Network Graphic (PNG), Portable Document Format (PDF), or the like.

Second, the VIR system 100 receives the vehicle images $200_1$-$200_j$ from the dealership $102_1$ and temporarily stores the vehicle images $200_1$-$200_j$ in the vehicle image data store 110. In particular, the vehicle images $200_1$-$200_j$ pertain to a specific vehicle on the lot of the dealership $102_1$. For example, a particular vehicle (e.g., vehicle with a VIN of "1HHCM8263JAxxxxx") may be located on a lot of the dealership $102_1$ and available for purchase or lease by a consumer. The dealership $102_1$ provides the vehicle images $200_1$-$200_j$ of the particular vehicle to the VIR system 100, with each of the vehicle images $200_1$-$200_j$ being of the particular vehicle from a selected viewpoint and/or providing an image of one or more features of the particular vehicle.

Third, the general flow of operations performed by the VIR system 100 continues with an analysis of the vehicle images $200_1$-$200_j$ by the image location (machine learning) logic 112. The analysis performed by the image location logic 112 results in an identification of a location of each specific vehicle intended to be the key component in each of the vehicle images $200_1$-$200_j$ (normally proximate to a center of the vehicle image). More specifically, the image location logic 112 applies a machine learning model, generated from supervised learning using a training set, to each vehicle image $200_1$, . . . , or $200_j$. The application of the machine learning model of the image location logic 112 to one of the vehicle images $200_1$-$200_j$ may include detection of a first set of points of interest using algorithms such as edge detection algorithms, corner detection algorithms, blob detection algorithms, feature description algorithms, etc. As one example, a detected point of interest within a vehicle image may correspond to an edge of an edge of vehicle (e.g., bumper, window, etc.).

For each vehicle images $200_1$-$200_j$, the image location logic 112 outputs the original vehicle images $200_1$-$200_j$ and respective coordinates $210_1$-$210_j$ that define an area (e.g., bounding box) including a vehicle within the original vehicle images $200_1$-$200_j$. Stated differently, the coordinates $210_1$, . . . , or $210_j$ defines the bounding box including the entire vehicle within the vehicle image $200_1$, . . . , or $200_j$, respectively. As an illustrative example, coordinate $210_1$ may include the upper-left coordinate $(x_0,y_0)$ and the lower-right coordinate $(x_1,y_1)$ that define a corresponding bounding box inclusive of the advertised vehicle within the vehicle image $200_1$. It is contemplated that more coordinates may be needed when the area is more complex in form.

Fourth, the image location logic 112 provides each vehicle image $200_1$-$200_j$ and the coordinates $210_1$-$210_j$ to image modification logic 220. According to one embodiment of the disclosure, as illustrated by a first dashed area within the image modification logic 220, the image modification logic 220 includes the image cropping logic 114. Hence, for this embodiment, the image location logic 112 provides the vehicle images $200_1$-$200_j$ and the coordinates $210_1$-$210_j$ of the bounding boxes for the corresponding vehicle images $200_1$-$200_j$ to the image cropping logic 114. The image cropping logic 114 crops each vehicle image $200_1$-$200_j$ according to its corresponding bounding box $210_1$-$210_j$ to generate modified vehicle image $230_1$-$230_j$. The modified vehicle image $230_1$-$230_j$ and their corresponding coordinates $210_1$-$210_j$ are stored within the vehicle image data store 110, which may be subsequently accessed by the server widget logic 122 in response to a query for information pertaining to the particular vehicle (e.g., query by a widget residing in a website to communicate with server widget logic 122 when the dealership's website 130 is loaded by a consumer.

According to another embodiment of the disclosure, as illustrated by a second dashed area within the image modification logic 220, the image modification logic 220 includes the AR determination logic 116, the image repositioning and bounding box adjustment (IRBBA) logic 118 and the image cropping logic 114. Herein, the AR determination logic 116 determines an aspect ratio $235_1$-$235_j$ for each of the each vehicle image $200_1$-$200_j$. For each vehicle image $200_1$-$200_j$ (e.g., vehicle image $200_1$), the image repositioning and bounding box adjustment logic 118 uses the aspect ratio $235_1$ computed for the vehicle image $200_1$ and the coordinates $210_1$ to generate a secondary bounding box, which features an aspect ratio that is substantially equivalent (or identical) to the aspect ratio $235_1$ of the vehicle image $200_1$ with includes the vehicle substantially centered within the secondary bounding box. Thereafter, coordinates $240_1$-$240_j$ forming the secondary bounding boxes associated with the vehicle images $200_1$-$200_j$ are provided to the image cropping logic 114. The image cropping logic 114 crops each vehicle images $200_1$-$200_j$ according to its respective secondary bounding box $240_1$-$240_j$ to generate the modified vehicle image $230_1$-$230_j$. The modified vehicle image $230_1$-$230_j$ and their corresponding coordinates $240_1$-$240_j$ are stored within the vehicle image data store 110. Hence, the association between each original vehicle $200_R$ ($1 \le R \le j$), bounding box coordinate $210_R$ or $240_R$ and modified vehicle image $230_R$ is available from the vehicle image data store 110.

Additionally, although not shown in FIG. 2, the image location (machine learning) logic 126 may operate to classify each of the vehicle images $200_1$-$200_j$ separately from the image modification logic 220 (e.g., directly load classes into the vehicle image data store 110). Alternatively, the image location logic 126 may be configured to assign an image class to each of the modified vehicle images $230_1$-$230_j$ received from the image modification logic 220. More specifically, the image classification logic 126 of FIG. 1 applies a machine learning model to generate a mapping function that represents an algorithm for mapping input data to an output (e.g., a vehicle image to an image class, or to a listing of features or views).

The application of the machine learning model of the image classification logic 126 to one of the vehicle images $200_1$-$200_j$ (or modified vehicle images $230_1$-$230_j$) may include detection of a second set of points of interest with the vehicle image itself. As one example, a detected point of interest from the second set of points of interest may correspond to an edge of a steering wheel. The detected points of interest may be provided to the classification machine learning model, which represents a correlation to the images comprising the training set used in generating the classification machine learning model. In one embodiment, the application of the machine learning model may provide a result for each vehicle image $200_1$-$200_j$ (or modified vehicle images $230_1$-$230_j$), such as a numerical score, which indicates the class to which each vehicle image $200_1$-$200_j$ (or modified vehicle images $230_1$-$230_j$) is assigned, as discussed below.

As one example, the image classification may assign one of a plurality of classes to a vehicle image, with some classes specifying, among others, "Front ¾ View Drivers," "Front ¾ View Passenger," "Side View Passenger," "Rear ¾ View Passenger," "Side View Drivers," "Rear View," "Roof/Sunroof" "Driver's Dashboard/Centre Console," "Center Console," "Door Controls," etc. Additionally, the assignment of the same classes to the portions of the feature content may be predetermined and performed upon, or prior to, storage of portions of feature content in the feature content data store 120, as discussed below.

Figure 7:
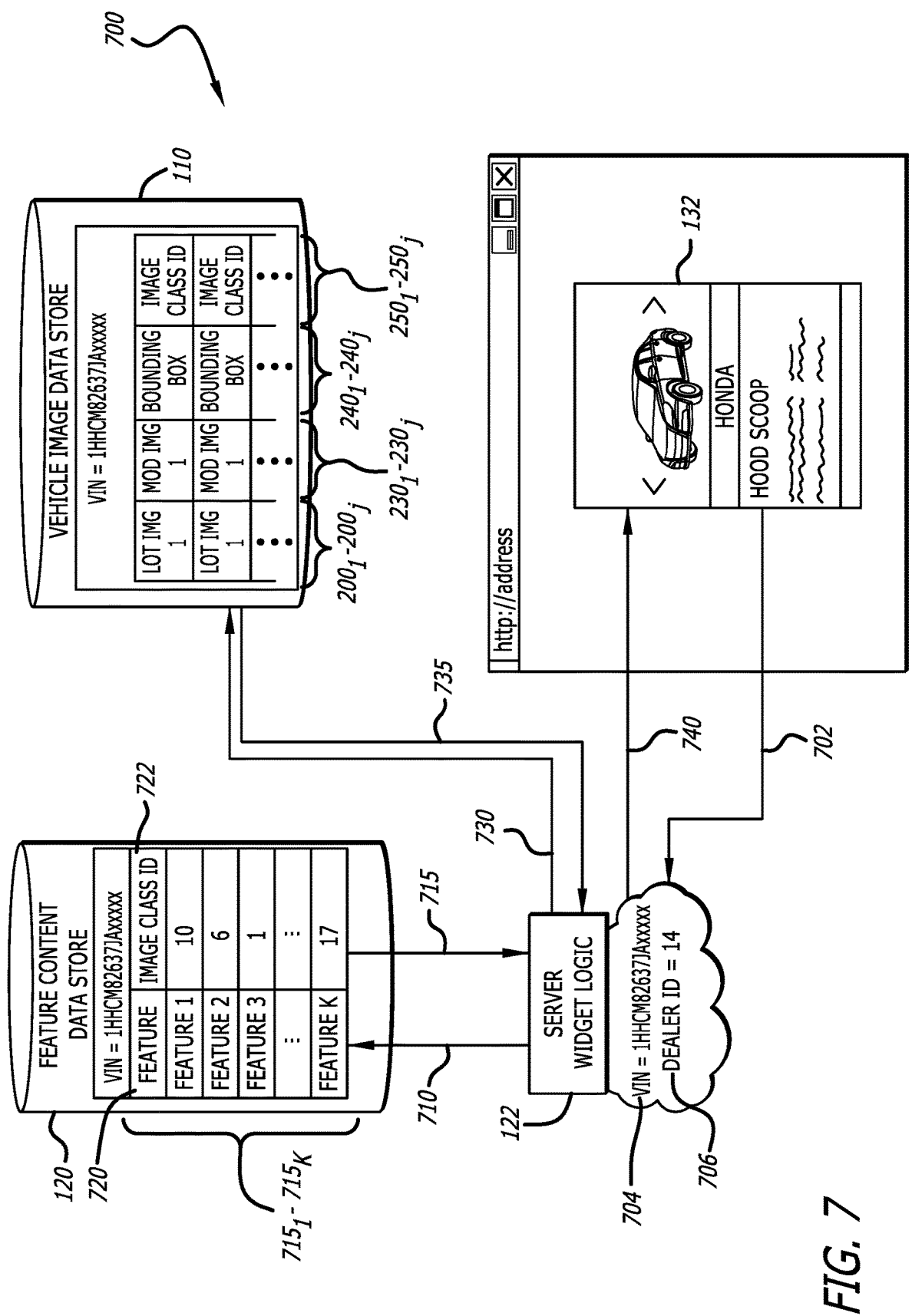
FIG. 7 illustrates a block diagram providing a flow of the utilization of a modified vehicle image along with feature content corresponding to the image class of the modified vehicle image.

Fifth, upon assignment of an image class to each of the modified vehicle images $230_1$-$230_j$, the modified vehicle images $230_1$-$230_j$ and their corresponding classes, e.g., the classes $250_1$-$250_j$, are again stored in the vehicle image data store 110. Additional details regarding the image classification process and storage are described in U.S. patent application Ser. No. 16/290,696 entitled "Method and System for Vehicle Image Classification," filed Mar. 1, 2019, the entire contents of which are incorporated by reference herein. The feature content data store 120 stores feature content, which includes, at least, textual information describing one or more features or views of specific vehicles on the dealer's lot, e.g., the vehicle$_{VIN=1HHCM8 \ldots}$. The feature content related to the vehicle$_{VIN=1HHCM8 \ldots}$ may be divided into portions such that each portion describes a feature of the vehicle$_{VIN=1HHCM8 \ldots}$ and is assigned an image class, as illustrated in FIG. 7. For instance, the modified vehicle image $230_1$ may display a first feature and be assigned, for example, "category 10," and a first portion of the feature content includes textual information describing the first feature and is also assigned "category 10." Each portion of the feature content comprises information describing a particular feature or view and is assigned the class corresponding to the classes assigned to the modified vehicle images $230_1$-$230_j$ illustrating the feature or view. In one embodiment, the feature content portions may comprise textual information. In additional embodiments, the feature content portions may comprise textual information and/or additional information, which may include audio and/or video data.

Sixth, the general flow of operations performed by the VIR system 100 continues via as a widget embedded in the website 130 of the dealership $102_1$ receives consumer input. Specifically, when a consumer visits the website 130, e.g., loads the website 130 via an internet browser over an internet connection, a widget, e.g., software code embedded into the source code of the website 130 (not shown), initiates communication with the server widget logic 122 and renders a graphical user interface (GUI) 132 on a portion of the website 130. The widget receives consumer input indicating a selection of a specific vehicle on the lot of the dealership $102_1$, e.g., the vehicle$_{VIN=1HHCM8 \ldots}$, through the GUI 132. In response to receiving the user input, the widget passes a set of parameters to the server widget logic 122, which may include, a dealership identifier and the VIN of the selected vehicle located on the lot of the dealership $102_1$.

Seventh, in response to receiving the parameters from the widget indicating the selection of a specific vehicle and the corresponding dealership, e.g., the vehicle$_{VIN=1HHCM8 \ldots}$ and the dealership $102_1$ or a representation thereof, the server widget logic 122 determines the features included in the vehicle$_{VIN=1HHCM8 \ldots}$, given that the features for each manufactured car is maintained in a master database (VIN/features) accessible to the VIR system 100. Additionally, the server widget logic 122 retrieves each modified vehicle image of the vehicle$_{VIN=1HHCM8 \ldots}$, e.g., modified vehicle images $230_1$-$230_j$. Further, the server widget logic 122 matches the features of the vehicle$_{VIN=1HHCM8 \ldots}$ with one or more portions of feature content stored in the feature data store 120 based on the classes assigned to each of the modified vehicle images $230_1$-$230_j$ and the portions of the feature content. More particularly, the server widget logic 122 (i) queries the vehicle image data store 110 for output digital images corresponding to the vehicle$_{VIN=1HHCM8 \ldots}$, e.g., the modified vehicle images $230_1$-$230_j$, and (ii) queries the feature content data store 120 for the feature content that corresponds to the features of the vehicle$_{VIN=1HHCM8 \ldots}$, wherein the queries may include the VIN and, optionally, the dealer identifier received from the widget.

The server widget logic 122 then generates an image-to-feature association that maps the features and views illustrated in each image to the respective image along with the corresponding one or more classes. For example, in one embodiment, a vehicle image may illustrate multiple features each corresponding to a single class, such that the vehicle image will be associated with a single class. In another embodiment, a first feature and a second feature may be illustrated in the vehicle image and assigned a first and second class, respectively, such that the vehicle image is associated with multiple classes. The image-to-feature association provides an association of: (i) a modified vehicle image, (ii) one or more features, and (iii) one or more classes. The server widget logic 122 then transmits the image-to-feature association for the vehicle$_{VIN=1HHCM8 \ldots}$ to the widget along with the modified vehicle images $230_1$-$230_j$ and corresponding feature content.

Finally, eighth, upon receiving the image-feature association from the server widget logic 122, the widget determines which of the modified vehicle images $230_1$-$230_j$ to display in the GUI 132. In one embodiment, when providing input to select a specific vehicle, the consumer also selects a view or feature of the vehicle, e.g., a "front view." For example, in order to determine a modified vehicle image to display and the corresponding class, the widget compares the consumer selected feature or view to a dataset, e.g., a table storing features/view and the corresponding classes, that indicates an image class corresponding to each feature and/or view. In one embodiment, the dataset may be stored in the persistent storage 108 of FIG. 1 and provided by the server widget logic 122 with the image-to-feature association. In an alternative embodiment, the dataset may be included within the widget. In yet another embodiment, a default view is used by the widget for an initial rendering of the display of the selected vehicle.

By comparing consumer input or the default view to the dataset, the widget may determine the class of the selected feature or view, which enables the widget to display the one or more portions of feature content based on the image-to-feature association. Upon determining the class, the widget causes the rendering of the vehicle image and the one or more portions of feature content that correspond to the determined one or more classes, with the rendering occurring within the GUI 132 of the website 130.

Figure 3:
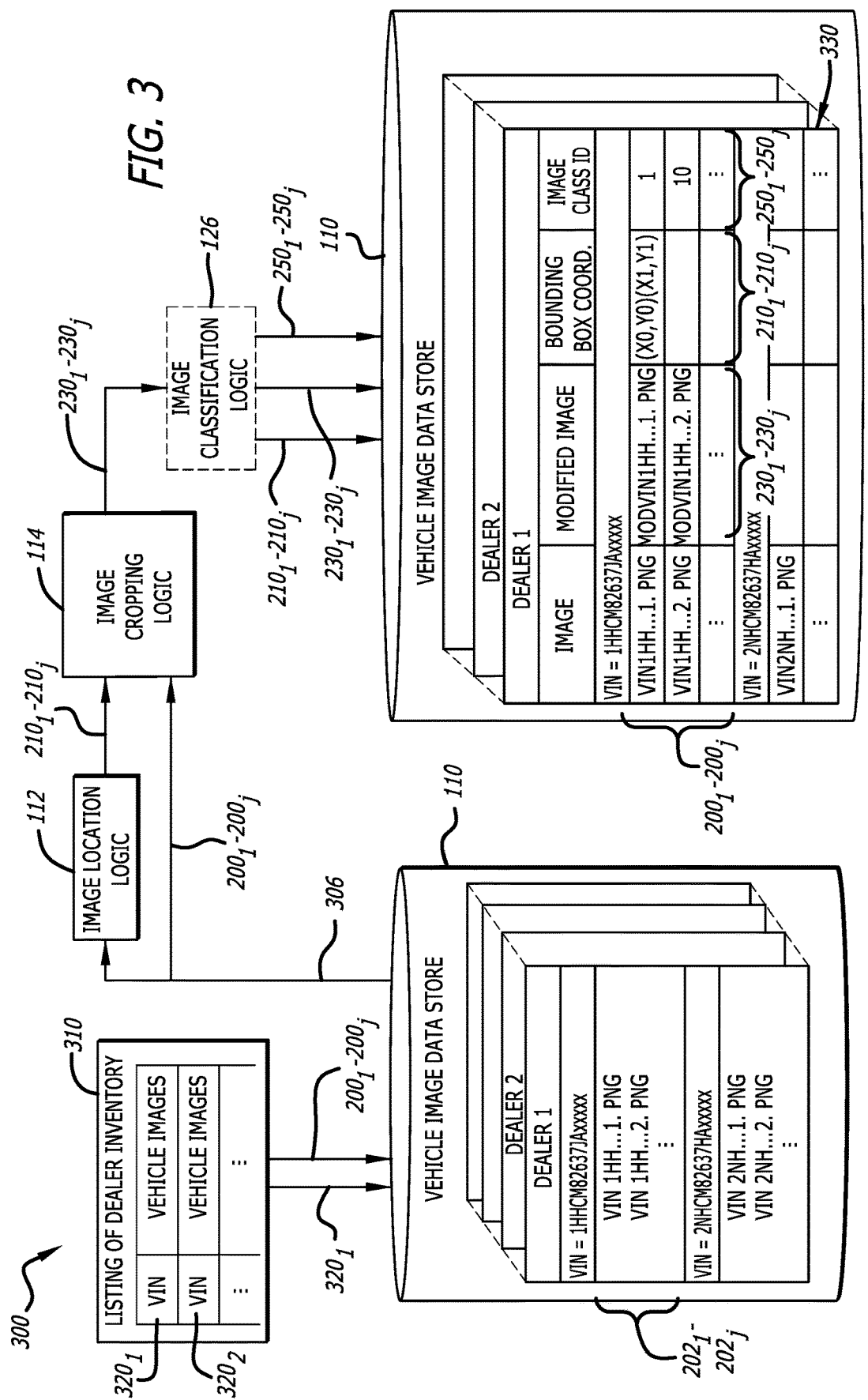
FIG. 3 illustrates a first exemplary embodiment of logic implemented within the VIR system of FIG. 1 that collectively generates a modified image with the advertised vehicle.

Referring to FIG. 3, a first exemplary embodiment of logic implemented within the VIR system of FIG. 1 that collectively generates a modified image with the advertised vehicle is shown. Herein, the flow 300 illustrates a listing 310 of active inventory records for a particular dealer. The listing 310 may include (i) a VIN $320_1$-$320_N$ (N≥1) associated with each vehicle (N) being sold by the particular dealer and (ii) the vehicle images $200_1$-$200_j$ (described in FIG. 2) for each of the vehicles being sold by the particular dealer and/or one or more links for accessing some or all of the vehicle images $200_1$-$200_j$. As an illustrative example, the listing 310 may include the vehicle (VIN) $320_1$ and vehicle images $200_1$-$200_j$ that correspond to the vehicle$_{VIN=1HHCM8\ldots}$ of dealership $102_1$ as discussed in FIG. 2.

Figure 4A:
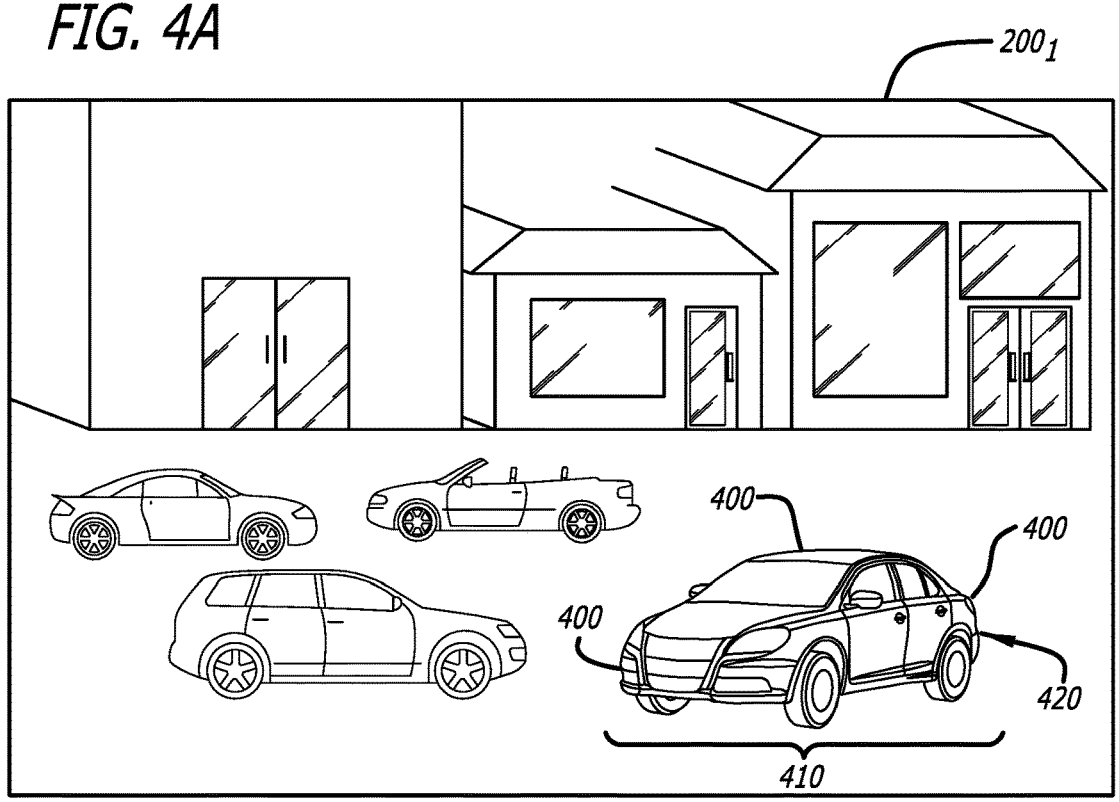
FIGS. 4A-4C illustrate an exemplary vehicle image being automatically modified by the VIR system of FIG. 1 according to the operations set forth in FIG. 3.

Following the storage of the dealer inventory (e.g., contents of listing 310, including vehicle images $200_1$-$200_j$ for each vehicle identified by the VIN $320_1$) in the vehicle image data store 110, at least the vehicle images $200_1$-$200_j$ are provided to the image location logic 112 for analysis. As discussed above, the analysis includes applying a machine learning model previously generated by the image location logic 112 to the vehicle images $200_1$-$200_j$ (e.g., vehicle image 2000. For each vehicle image $200_1$-$200_j$, such as vehicle image $200_1$ as shown in FIG. 4A for example, the image location logic 112 applies the machine learning model to detect the first set of points of interest 400 (e.g., locations in the vehicle image $200_1$ around the perimeter of the displayed vehicle 420), where these points of interest 400 are used to determine a location 410 of the vehicle 420 displayed in the vehicle image $200_1$.

Figure 4B:
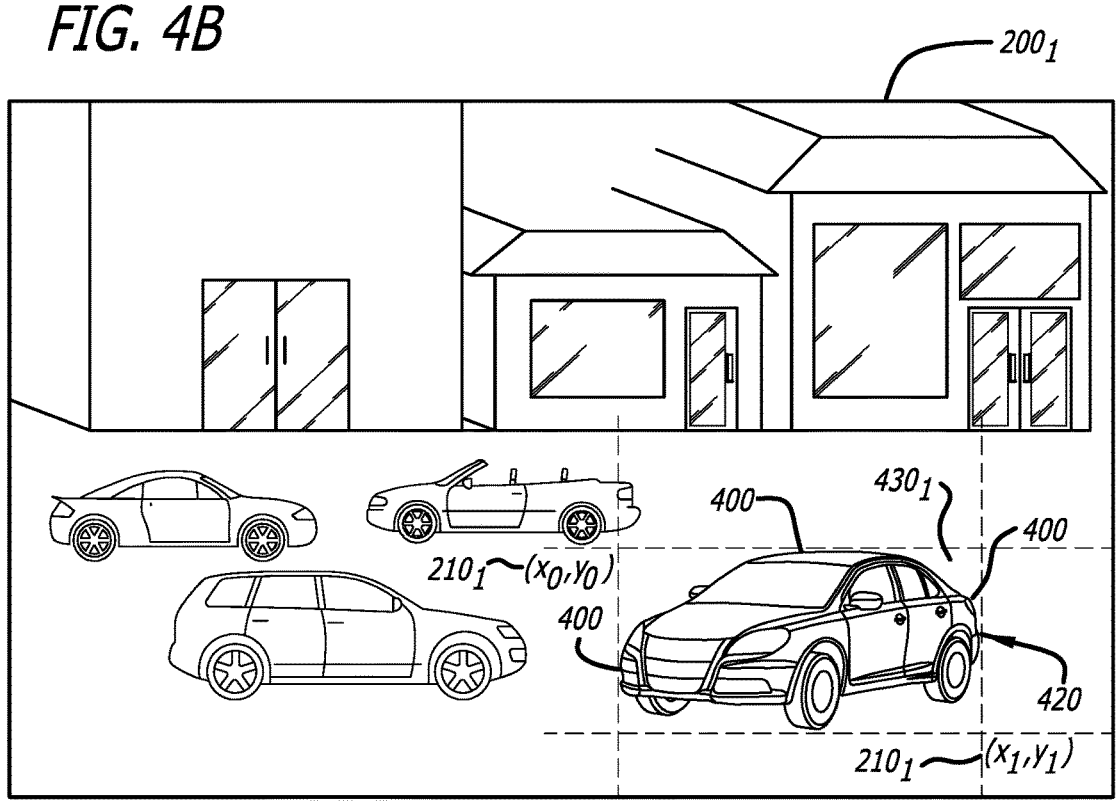
Figure 4C:
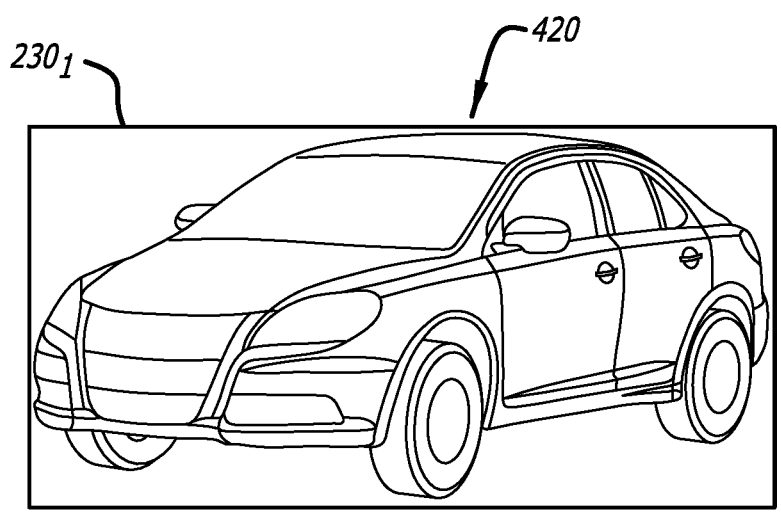

Referring to FIG. 3 and FIG. 4B, from these points of interest 400 defining the location of the vehicle 420 within the vehicle image $200_1$, the image location logic 112 determines coordinates $210_1$ of a boundary area (e.g., bounding box $430_1$) that surrounds the vehicle 420 and provides the coordinates $210_1$ of the bounding box $430_1$, such as the upper-left coordinate $(x_0,y_0)$ and the lower-right coordinate $(x_1,y_1)$ for example, to the image cropping logic 114. The image cropping logic 114 crops the vehicle image $200_1$ according to the bounding box $430_1$ to generate a modified vehicle image $230_1$ (see FIG. 4C) to be rendered on a website of the dealership that provided the vehicle image $200_1$.

Additionally, the modified vehicle image $230_1$ may be provided to a machine learning model utilized by the image classification logic 126. The image classification logic 126 applies a machine learning model for classifying the type of image relating to the displayed features, resulting in an assignment of an image class to the modified vehicle image $230_1$.

The results of the analysis, such as the modified vehicle image $230_1$, bounding box $430_1$ and assigned class $250_1$, are provided to the vehicle image data store 110 for storage. Hence, an exemplary illustration of storage of the dealer inventory (e.g., VINs and corresponding original vehicle images $200_1$-$200_j$) along with coordinates $210_1$-$210_j$ of the bounding boxes $430_1$-$430_j$, modified vehicle images $230_1$-$230_j$, and assigned classes $250_1$-$250_j$ for each of the modified vehicle images $230_1$-$230_j$ is shown to formulate a data store 330. The data store 330, such as a table or other data storage mechanism (collectively referred to as a "table"), may be generated for each dealership $102_1$-$102_i$ such that the dealer inventory is stored on a per dealership basis. Further, the exemplary diagram of FIG. 3 illustrates that each table may include (i) a column for the original vehicle images $200_1$-$200_j$; (ii) a column including the corresponding modified vehicle images $230_1$-$230_j$; (iii) a column including coordinates for the corresponding bounding box coordinates $210_1$-$210_j$; and (iv) a column including the corresponding class, e.g., the classes $250_1$-$250_j$.

Figure 5:
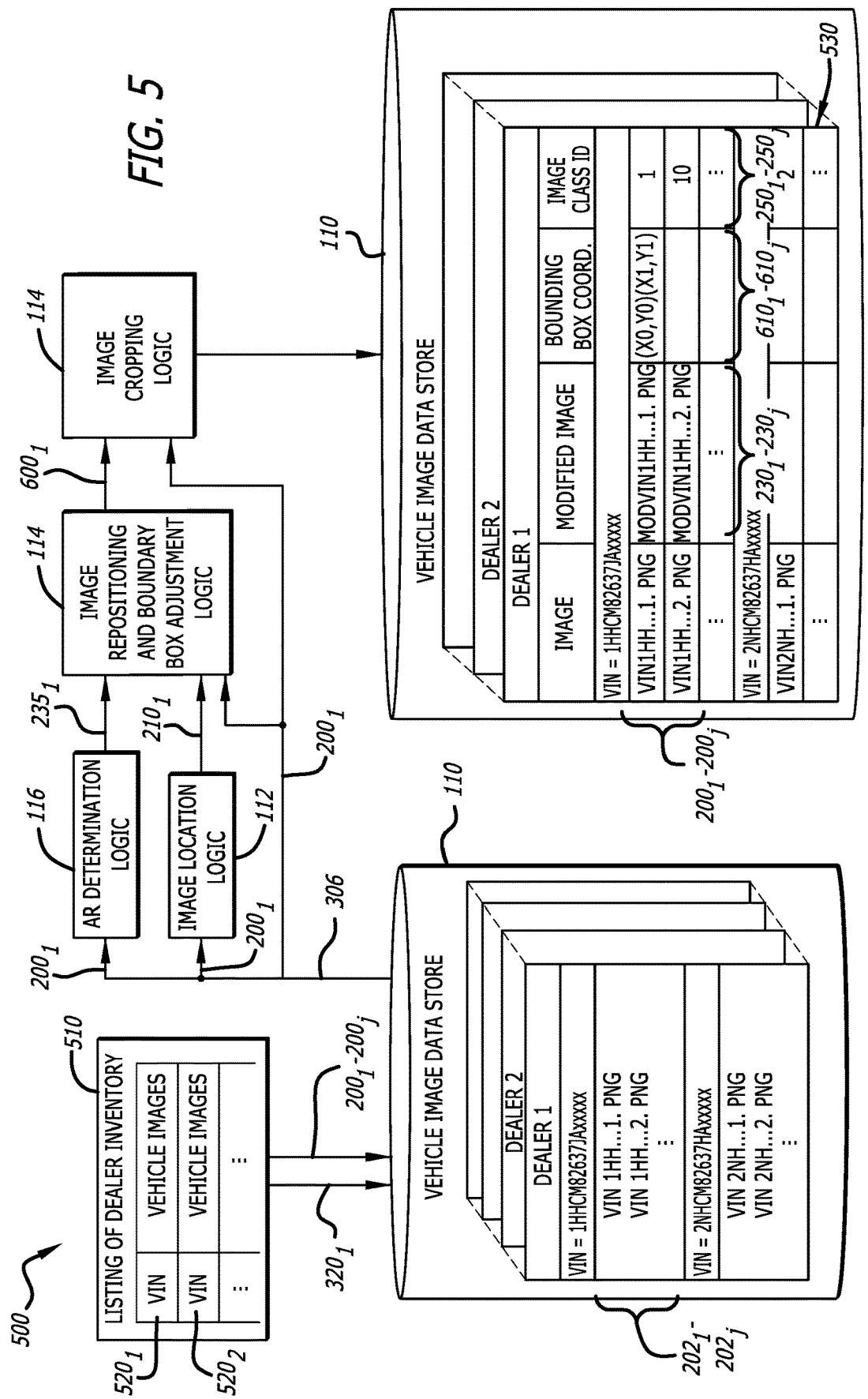
FIG. 5 illustrates a second exemplary embodiment of logic implemented within the VIR system of FIG. 1 that collectively generates a modified image with the advertised vehicle.

Referring now to FIG. 5, a second exemplary embodiment of logic implemented within the VIR system of FIG. 1 that collectively generates a modified image with the advertised vehicle is shown. As described above, the flow 500 illustrates a listing 510 of active inventory records for a particular dealer. The listing 510 may include (i) a VIN $520_1$-$520_N$ (N≥1) associated with each "N" vehicle being advertised by the particular dealer and (ii) the vehicle images $200_1$-$200_j$ (described in FIG. 2) for each of the vehicles being advertised by the particular dealer and/or one or more links for accessing some or all of the vehicle images $200_1$-$200_j$. As an illustrative example, the listing 510 may include the vehicle (VIN) $520_1$ and vehicle images $200_1$-$200_j$ that correspond to the vehicle$_{VIN-1HHCM8\ldots}$ of dealership $102_1$ as discussed above.

Figure 6A:
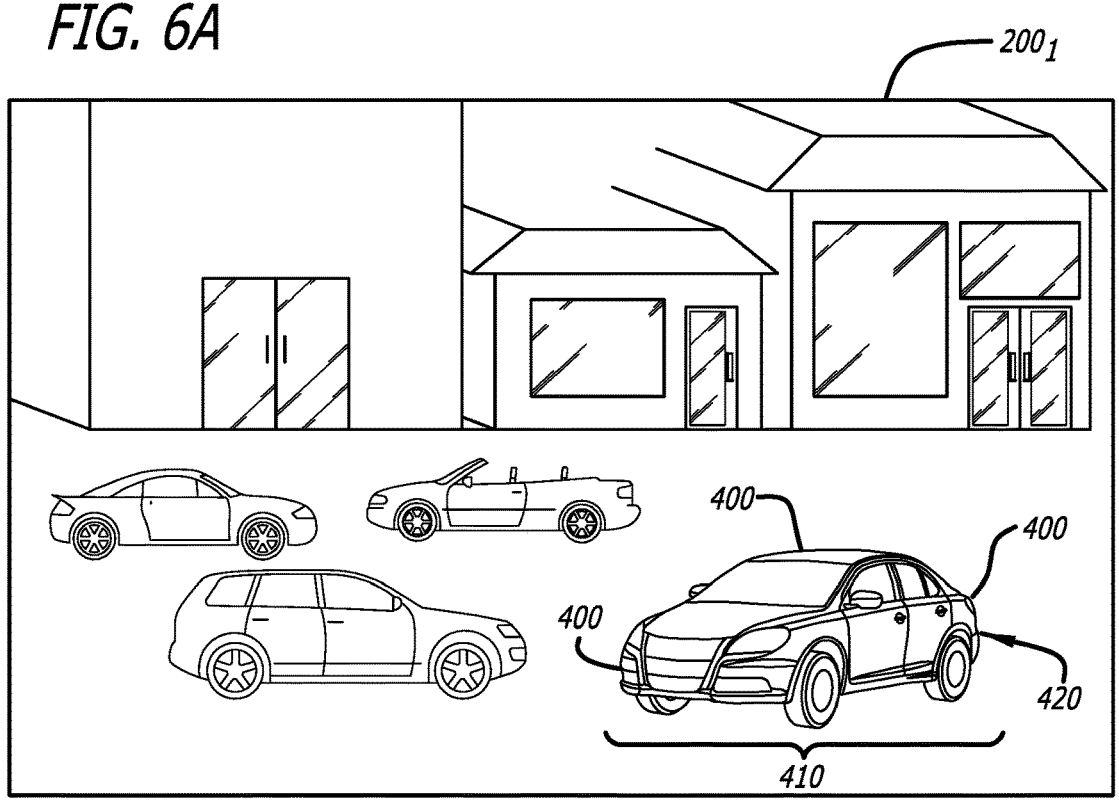
FIGS. 6A-6F illustrate an exemplary vehicle images being automatically modified by the VIR system of FIG. 1 according to the operations set forth in FIG. 5.

Following the storage of the dealer inventory (e.g., contents of listing 510, including vehicle images $200_1$-$200_j$ for each vehicle identified by the VIN $520_1$) in the vehicle image data store 110, at least the vehicle images $200_1$-$200_j$ are provided to the image location logic 112 and the AR determination logic 116 for analysis. Herein, the image location logic 112 applies a machine learning model previously generated by the image location logic 112 to the vehicle images $200_1$-$200_j$ (e.g., vehicle image $200_1$). For each vehicle image $200_1$-$200_j$, such as vehicle image $200_1$ as shown in FIG. 6A for example, the image location logic 112 applies the machine learning model to detect points of interest 400 (e.g., locations in the vehicle image $200_1$ around the perimeter of the displayed vehicle), where these points of interest 400 are used to determine the location 410 of the vehicle 420 displayed in the vehicle image $200_1$ as described above. Additionally, the AR determination logic 116 determines the aspect ratio $235_1$ for the vehicle image $200_1$.

Figure 6B:
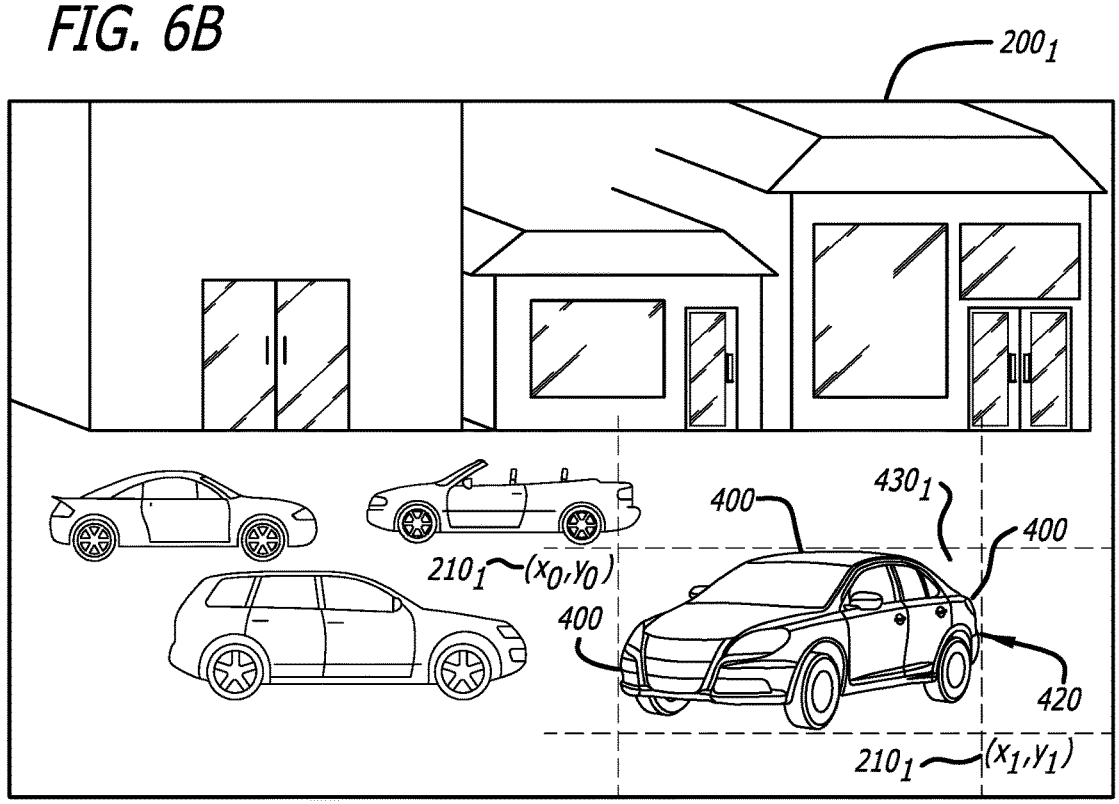
Figure 6C:
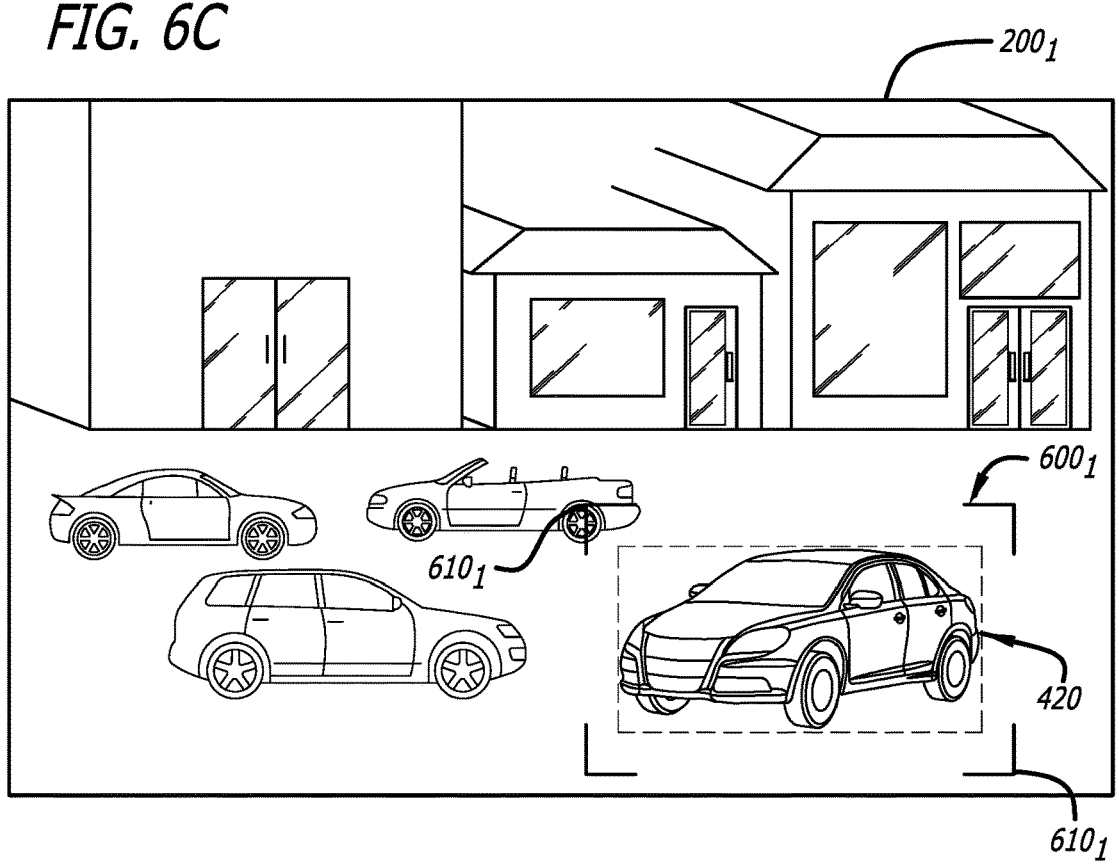

Referring to FIG. 5 and FIG. 6B, from these points of interest 400 defining the location of the vehicle 420 within the vehicle image $200_1$, the image location logic 112 determines coordinates $210_1$ of a boundary box $430_1$ that surrounds the vehicle 420 and provides the coordinates $210_1$ of the bounding box $430_1$, such as the upper-left coordinate $(x_0,y_0)$ and the lower-right coordinate $(x_1,y_1)$ for example. The image location logic 112 provides the coordinates $210_1$ to the image repositioning and bounding box adjustment logic 118. The image repositioning and bounding box adjustment logic 118 also receives the aspect ratio $235_1$ of the vehicle image $200_1$ from the AR determination logic 116.

Figure 6D:
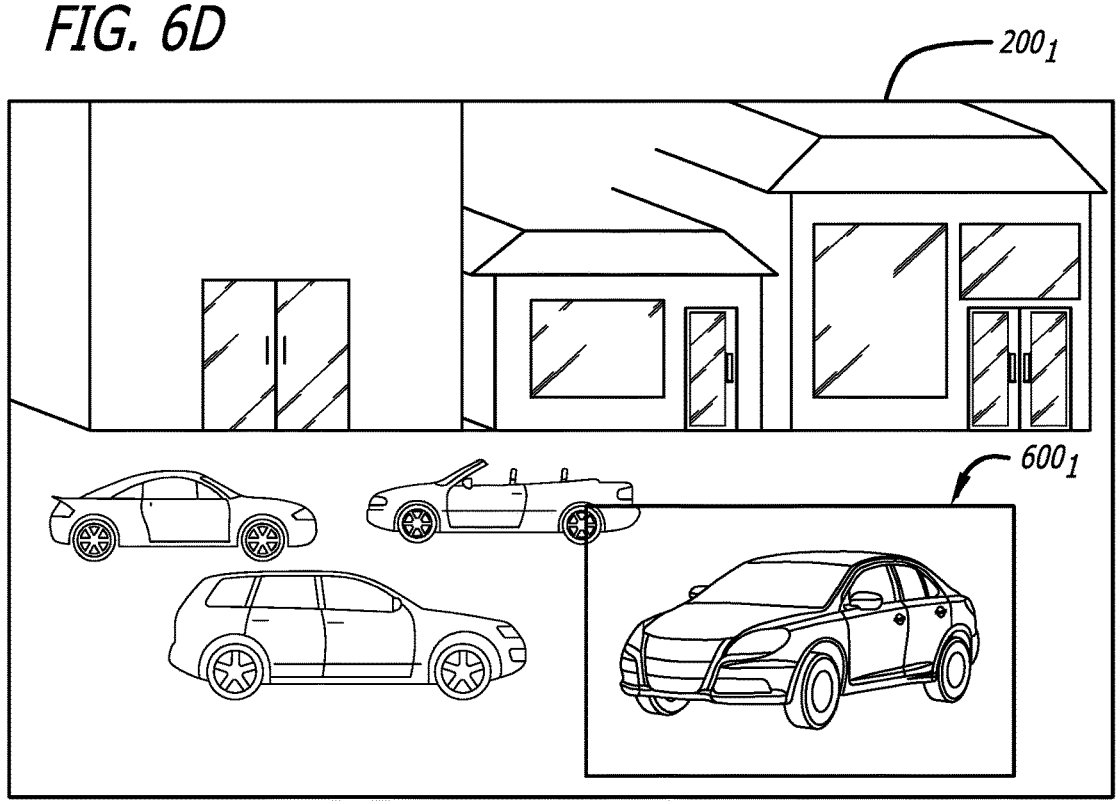
Figure 6E:
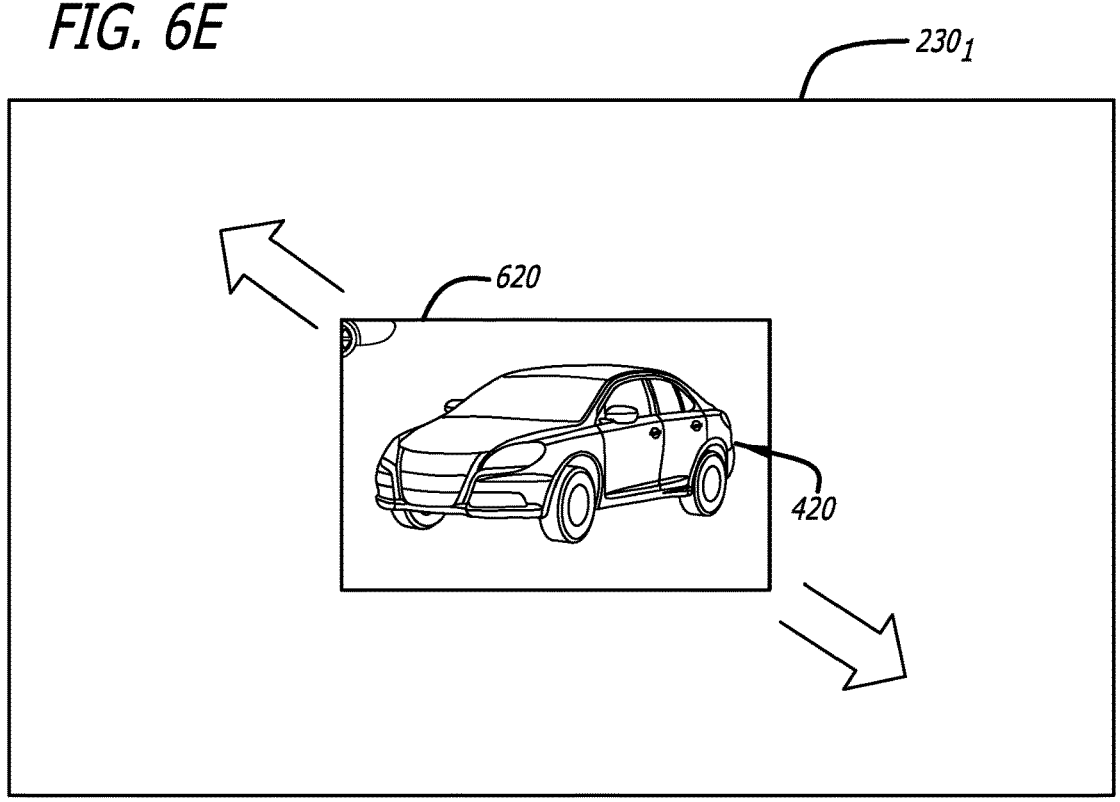
Figure 6F:
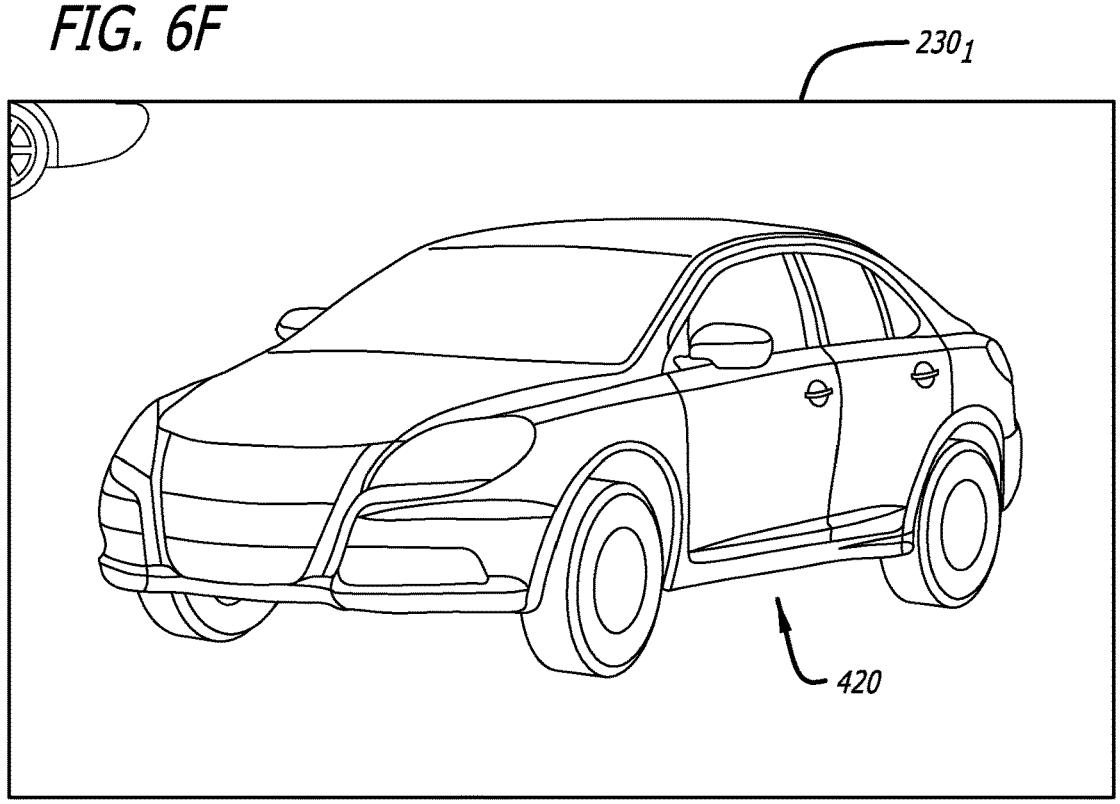

For vehicle image $200_1$, the image repositioning and bounding box adjustment logic 118 uses the aspect ratio $235_1$ computed for the vehicle image $200_1$ and the coordinates $210_1$ to generate a secondary bounding box $600_1$, which features an aspect ratio that is substantially equivalent (or identical) to the aspect ratio $235_1$ of the vehicle image $200_1$ and includes the vehicle 420 substantially centered within the secondary bounding box $600_1$. Thereafter, the coordinates $610_1$ defining the secondary bounding box $600_1$ are provided to the image cropping logic 114. As shown in FIG. 6D, the image cropping logic 114 crops the vehicle image $200_1$ according to the secondary bounding box $600_1$ to generate the modified vehicle image $230_1$, as shown in FIG. 6E. The cropped image 620 may be stretched to expand the sizing of the image of the vehicle 420 as shown in FIG. 6F. The modified vehicle image $230_1$ and corresponding coordinates $610_1$ are stored within the vehicle image data store 110.

Additionally, the modified vehicle image $230_1$ may be provided to a machine learning model utilized by the image classification logic 126. The image classification logic 126 applies a machine learning model for classifying the type of image relating to the displayed features, resulting in an assignment of an image class to the modified vehicle image $230_1$.

The results of the analysis, such as the modified vehicle image $230_1$, second bounding box coordinates $610_1$ and assigned class $250_1$, are provided to the vehicle image data store 110 for storage (operation 308). Hence, an exemplary illustration of storage of the dealer inventory (e.g., VINs and corresponding original vehicle images $200_1$-$200_j$) along with coordinates $610_1$-$610_j$ of the bounding boxes $600_1$-$600_j$, modified vehicle images $230_1$-$230_j$, and assigned classes $250_1$-$250_j$ for each of the modified vehicle images $230_1$-$230_j$ is shown to formulate a data store 530. The data store 530, such as a table for example, may be generated for each dealership $102_1$-$102_i$ such that the dealer inventory is stored on a per dealership basis. Further, the exemplary diagram of FIG. 5 illustrates that each table may include (i) a column for the original vehicle images $200_1$-$200_j$; (ii) a column including the corresponding modified vehicle images $230_1$-$230_j$; (iii) a column including coordinates for the corresponding secondary bounding box coordinates $610_1$-$610_j$; and (iv) a column including the corresponding class, e.g., the classes $250_1$-$250_j$.

Referring now to FIG. 7, a block diagram providing a flow 700 of the utilization of classified modified vehicle images along with feature content corresponding to the class of the vehicle image is shown. As an initial operation in the flow, a request message 702 may be received based on operations being conducted on the widget via the GUI 132. Herein, the request message 702, including a VIN 704 (1HHCM82637Axxxxx) for the selected vehicle and a dealer identifier (Dealer_ID) 706, is provided to the server widget logic 122. Upon decoding the VIN 704, the server widget logic 122 is able to determine what features are associated with the vehicle identified by the VIN 704.

Based on the VIN 704, the server widget logic 122 (or logic operating in concert with the server widget logic 122) determines what features are associated with the vehicle identified by the VIN 704. According to one embodiment of the disclosure, the server widget logic 122 (or logic operating in concert with the server widget logic 122) accesses "build data" external to the VID system to determine vehicle option codes associated with the VIN 704. According to one embodiment, the "build data" may include vehicle option codes for millions of vehicles that are classified by their VINs. Each "vehicle option code" is a prescribed value that is used by a particular original equipment manufacturer (OEM) to identify what features are installed on the vehicle identified by the VIN 704. Upon determining the features associated with the vehicle, the server widget logic 122 (or logic operating in concert with the server widget logic 122) issues signaling 710 to receives stored information 715 (identified specifically on a per feature basis as feature information $715_1$-$715_K$) from the feature content data store 120. The stored information 715 includes meta-information associated with each feature, including (i) textual information 720 associated with each feature (i.e., feature content) along with a classification identifier 722.

Upon receipt of the stored information, the server widget logic 116 may transmit one or more query messages 730 to the vehicle image data store 110 for modified vehicle images $230_1$-$230_j$ with classification identifiers matching features associated with the vehicle identified by the VIN 704 having the same classification identifiers. The matching modified vehicle images 735 is returned to the server widget logic 122 (or logic operating in concert with the server widget logic 122). According to one embodiment of the disclosure, the server widget logic 122 correlates the matching modified vehicle images 735 to the feature information $715_1$-$715_K$. Thereafter, the server widget logic 122 returns a response message 740 to the widget with a list of features on each vehicle and the associated URL to the image to illustrate the feature or features set forth in the list.

In additional embodiments, the feature content data store 120 may be split into multiple data stores. For example, a first data store may include a table for each VIN that includes a list of features of the vehicle corresponding to the VIN, and a second data store may include a feature to class association.

Figure 8:
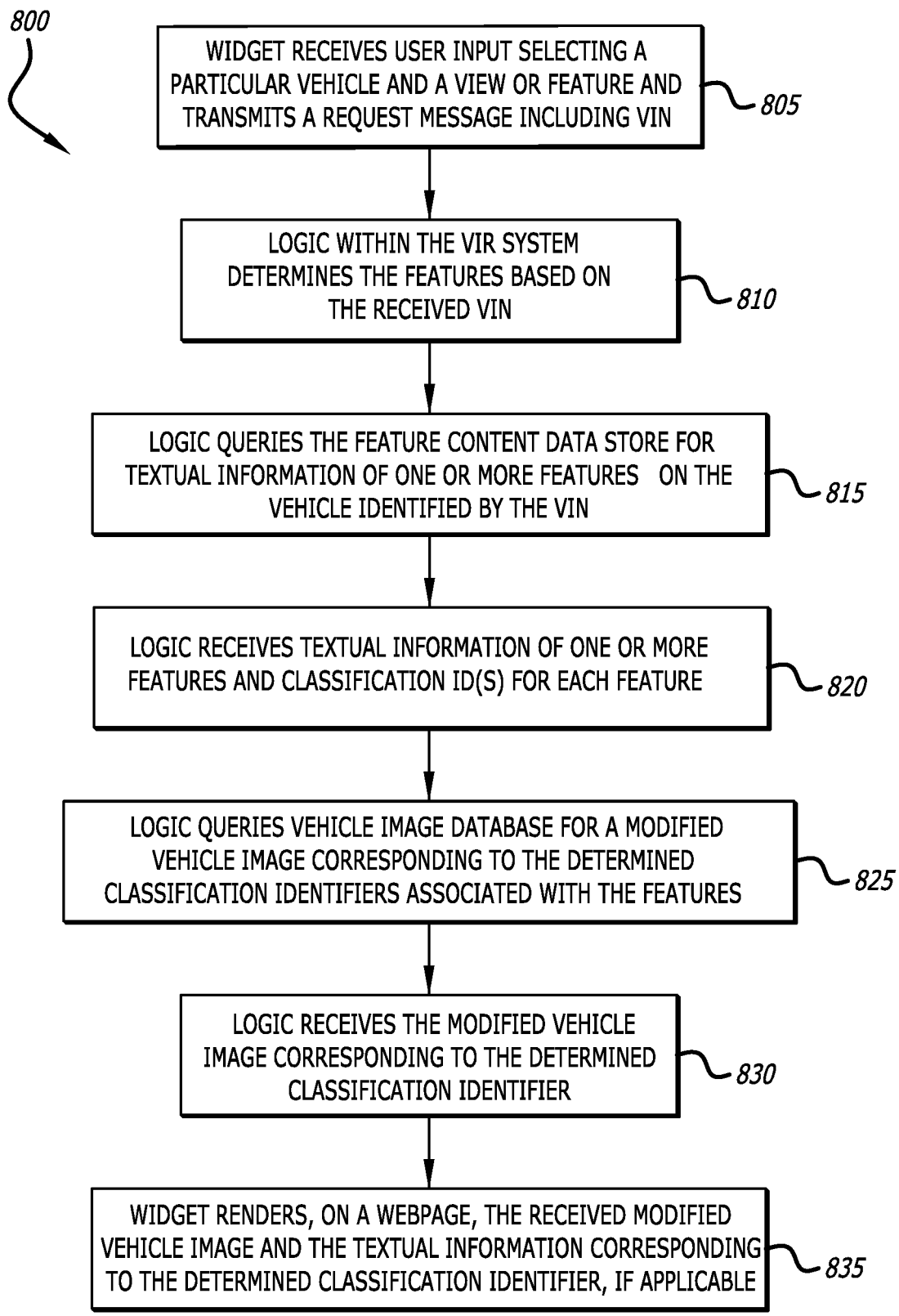
FIG. 8 is a flowchart illustrating the utilization of modified vehicle images along with feature content corresponding to the image class of the vehicle image of FIG. 7.

Referring to FIG. 8, a flowchart illustrating the utilization of classified, modified vehicle images along with feature content corresponding to the class of the modified vehicle image of FIG. 7 is shown. Each block illustrated in FIG. 8 represents an operation performed in the method 800 of rendering a portion of a webpage to include a modified vehicle image and feature content based on received user input and according to a set of automatically classified modified vehicle images. It is assumed that prior to the beginning of the method 800, a dealership website has been loaded via an internet browser, with the server widget logic 122 of FIG. 1 causing the rendering of the GUI 132 on at least a portion of dealership's website. Thus, the method 800 begins when the widget receives user input selecting a particular vehicle, and, optionally, a view or feature of the selected vehicle (block 805). In one embodiment, the user input may also indicate particular view and/or feature of the vehicle, as discussed above. In other embodiments, when the user input does not include the selection of a view or a feature, default settings may be utilized indicating a view and/or feature.

In response to receiving the user input, the widget transmits the VIN of the selected vehicle and a dealership identifier of the dealership selling the selected vehicle to server widget logic. The server widget logic (or logic operating with the server widget logic 122), using the VIN, determines the features associated with the vehicle identified by the VIN (block 810). Thereafter, the server widget logic queries the feature content data store for textual information of one or more features on the vehicle identified by the VIN, and in response, receives textual information of one or more features along with their classification identifiers (blocks 815 and 820).

Upon receipt of the classification identifiers, the server widget logic (or logic operating with the server widget logic 122) issues a request message to query the vehicle image database for modified vehicle images corresponding to the retrieved classification identifiers (block 825). The server widget logic (or logic operating with the server widget logic 122) receives one or more modified vehicle images corresponding to the retrieved classification identifiers (block 830).

The widget then renders, on a portion of the dealership's website, a display for the consumer of a modified vehicle image and textual information corresponding to the determined class (block 835). As discussed above, the widget may not cause the rendering of a modified vehicle image or textual information corresponding to the determined class when either is not available. In some instances, default images or contextual information may be used.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. An image readjustment system, comprising:
   one or more processors; and
   a persistent storage communicatively coupled to the one or more processors, the persistent storage comprises
   an image location logic to receive and analyze an incoming image, using a machine learning analysis, to determine a location of a particular component within the incoming image and to calculate coordinates of a boundary area surrounding the particular component, an aspect ratio determination logic configured to determine an aspect ratio of the incoming image, an image repositioning logic that is configured to use both the aspect ratio determined for the incoming image and the coordinates of the boundary area to generate a secondary boundary area including the particular component substantially centered within the secondary boundary area and featuring an aspect ratio that is (i) equal to the aspect ratio of the incoming image or (ii) substantially equivalent to the aspect ratio of the incoming image as being within three-percent of the aspect ratio of the incoming image, and an image cropping logic to remove portions of the incoming image outside of the secondary boundary area to generate a modified image to be rendered for display.

2. The image readjustment system of claim 1, wherein the image location logic to calculate the coordinates of the boundary area and provide at least two coordinates of the boundary area to the image cropping logic.

3. The image readjustment system of claim 1, wherein the modified image and coordinates of the particular component are stored within a data store of the persistent storage, the data store being accessible by logic for rendering the modified image.

4. The image readjustment system of claim 1, wherein the particular component is an image of a vehicle.

5. The image readjustment system of claim 4, wherein the persistent storage further comprises widget server logic that is configured to receive a communication from a widget, being software code residing in a website, to obtain information pertaining to the vehicle including the modified image of the vehicle.

6. The image readjustment system of claim 1, wherein the image repositioning logic being communicatively coupled to the image cropping logic to remove portions of the incoming image outside of the secondary boundary area including at least a portion of the boundary area.

7. The image readjustment system of claim 1, wherein the image location logic is further configured to determine whether the incoming information includes customized information and preclude generation of the boundary area and the second boundary area to avoid cropping of the incoming image to retain the customized information, the customized information including any of dealership information, salesperson information or dealer logos.

8. A computerized method operating within a server device for analyzing images using machine learning logic, trained through supervised learning, to identify and reposition a targeted component of a first component type associated with training data provided during the supervised learning, comprising:

receiving an incoming image;

analyzing the incoming image, using the machine learning logic, to determine a location of the targeted component within the incoming image including a plurality of components of the first component type and to calculate coordinates of a boundary area surrounding the targeted component;

determining an aspect ratio of the incoming image;

determining a secondary boundary area based on the aspect ratio and the coordinates of the boundary area determined for the incoming image, wherein the targeted component is substantially centered within the secondary boundary area and the secondary boundary area featuring an aspect ratio that is (i) equal to the aspect ratio of the incoming image or (ii) substantially equivalent to the aspect ratio of the incoming image as being within three-percent of the aspect ratio of the incoming image; and removing portions of the incoming image outside of the secondary boundary area to generate a modified image to be rendered for display.

9. The computerized method of claim 8, wherein the calculating of the coordinates of the boundary area comprises determining at least two coordinates to form the boundary area.

10. The computerized method of claim 8, wherein the removing of the portion of the incoming image outside of the secondary boundary area occurs after centering the targeted component within the secondary boundary area.

11. The computerized method of claim 10, wherein the targeted component is an image of a vehicle appearing to be a key component of the image and the first component type is directed to vehicles.

12. The computerized method of claim 11 further comprising:

storing the modified image within a data store accessible by the server device;

retrieving the modified image from the data store in response to widget server logic, implemented within the server device and configured to receive a communication from a widget, being software code residing in a website in response to a dealership website being loaded by a network device of a consumer, to obtain information pertaining to the vehicle including the modified image of the vehicle.

13. An image readjustment method, comprising:

receiving and analyzing an incoming image, using a machine learning analysis, to determine a location of a particular component within the incoming image and to calculate coordinates of a boundary area surrounding the particular component;

determining an aspect ratio of the incoming image;

generating a secondary boundary area based on both the aspect ratio determined for the incoming image and the coordinates of the boundary area, the secondary boundary area including the particular component substantially centered within the secondary boundary area and an aspect ratio that is (i) equal to the aspect ratio of the incoming image or (ii) substantially equivalent to the aspect ratio of the incoming image as being within three-percent of the aspect ratio of the incoming image; and removing portions of the incoming image outside of the secondary boundary area to generate a modified image to be rendered for display.

14. The image readjustment method of claim 13, wherein analyzing of the incoming image comprises calculating the coordinates of the boundary area and at least two coordinates of the boundary area for use in removing of the portions of the incoming image outside of the secondary boundary area.

15. The image readjustment method of claim 13, wherein the modified image and coordinates of the particular component are stored within a persistent storage and accessed to render the modified image.

16. The image readjustment method of claim 13, wherein the particular component is an image of a vehicle.

17. The image readjustment method of claim 16 further comprising:
   receiving a communication from a widget, being software code residing in a website, to obtain information pertaining to the vehicle including the modified image of the vehicle.

18. The image readjustment method of claim 13 further comprising:
   removing portions of the incoming image outside of the secondary boundary area including at least a portion of the boundary area.

\* \* \* \* \*